United States Patent [19]

Suzuki

[11] Patent Number: 5,272,642
[45] Date of Patent: Dec. 21, 1993

[54] CAD/CAM DEVICE WITH HIERARCHICAL DATA STRUCTURE

[75] Inventor: Junko Suzuki, Nagoya, Japan

[73] Assignee: Mitsubishi Denki Kabushiki Kaisha, Tokyo, Japan

[21] Appl. No.: 864,544

[22] Filed: Apr. 7, 1992

[30] Foreign Application Priority Data

Apr. 11, 1991 [JP] Japan .................. 3-078901

[51] Int. Cl.$^5$ ............................................ G06F 15/46
[52] U.S. Cl. .............................. 364/474.24; 364/188; 395/120
[58] Field of Search ................ 364/474.22, 474.24, 364/188, 189; 395/118, 119, 120

[56] References Cited

U.S. PATENT DOCUMENTS

| | | | |
|---|---|---|---|
| 4,792,889 | 12/1988 | Kra elin et al. ............... | 364/191 |
| 4,933,865 | 6/1990 | Yamamoto et al. ............ | 364/474.24 |
| 5,115,400 | 5/1992 | Watanabe et al. ............. | 364/474.24 |
| 5,177,689 | 1/1993 | Kinasi et al. .................. | 364/474.26 |

FOREIGN PATENT DOCUMENTS

| | | |
|---|---|---|
| 2598000 | 10/1987 | France . |
| 2646725 | 11/1990 | France . |
| 2646726 | 11/1990 | France . |
| 2190268 | 11/1987 | United Kingdom . |

OTHER PUBLICATIONS

Dipl. Ing. T. T. Pham et al., "Automatisierte Attribut-- Programmierung für die Laser-Blechfertigung", vol. 86, No. 3, pp. 117–121, Mar. 1991.

H. Suzuki et al., "A Product Modeling System For Constructing Intellegent Cad And Cam Systems", vol. 4, No. 3–4, pp. 483–489, 1988.

J. Grum et al., "Design of the Database for Cad Based on Group Technology", vol. 4, No. 1/2, pp. 49–62, 1988.

Spur. Krause: "CAD-Technik", Carl Hauser, Muenchen and Wien, 1984, pp. 119–124.

J. F. Graetz: "Konzeption eines komplexen 3D-Modells mit beliebiger Flaechenstruktur:", ZWF 78 (1983), 12, pp. 564–571.

Primary Examiner—Jerry Smith
Assistant Examiner—Paul Gordon
Attorney, Agent, or Firm—Rothwell, Figg, Ernst & Kurz

[57] ABSTRACT

The CAD/CAM device includes a layer table 9 tabulating the layers each including the attributes 18 for the layer and the other-layers referencing information 19 for other layers. By establishing correspondence from the figure elements, the three-dimensional curves, and the three-dimensional forms to respective layer data, the figure elements, the three-dimensional curves and the three-dimensional forms are maintained hierarchically via the layer table 9. Further, the respective layer data are given hierarchical name 17. By designating a work layer at the root of a hierarchical tree data structure, all the information necessary for the generation of the NC data can be retrieved.

7 Claims, 7 Drawing Sheets

CAD/CAM DEVICE WITH HIERARCHICAL DATA STRUCTURE

BACKGROUND OF THE INVENTION

This invention relates to CAD/CAM devices (computer-aided design/computer-aided manufacturing devices), and more particularly to CAD/CAM devices by which the information for generating the data for numerically controlled devices is maintained hierarchically.

FIG. 9 is a block diagram showing the organization of a conventional CAD/CAM device.

The data are input via a keyboard 1, a mouse 2 or a tablet 3. The input data via the keyboard 1, the mouse 2, or the tablet 3 are interpreted by an input processing module 4 and then are transferred to the interior units. A figure processing module 85 defines and edits figure elements, such as points, lines, circles, dimension lines, and legends, or three-dimensional curves. Figure data 86 are thus generated via the figure processing module 85.

A work step processing module 90 defines and edits the work step data 91 needed for generating control data for a numerically controlled device such as a machine tool (not shown). A work path processing module 92 generates various figures and work paths and displays them on a CRT display unit 14. A NC data generator module 93 generates the NC data 15 for working a piece of work in accordance with the defined girure. The paths of the tool indicated by the NC data 15 thus generated by the NC data generator module 93 are displayed on the screen.

Next, the operation of the CAD/CAM device of FIG. 9 is described.

Consulting the display on the CRT display unit 14, the operator prepares various figures interactively via the keyboard 1, the mouse 2, or the tablet 3. Next, the operator selects the figure for the work path by inputting the name of the figure via the keyboard 1 or by pointing the figure by means of the mouse 2. Further, the operator sets the work step data 91 with respect to the figure data 86. The NC data generator module 93 then generates the NC data 15 by referencing the work step data 91.

The above CAD/CAM device has the following disadvantage. The data for the figure elements such as points, lines, circles, and curves, the data for three-dimensional curves, and the data for three-dimensional forms are maintained separately from each other. Thus, although the figure elements, three-dimensional curves, and three-dimensional forms are displayed without clear distinctions from each other on the screen, the operations to be performed by the operator for displaying, searching, and modifying them are distinct from each other. The operator may thus be confused. Further, it is difficult to treat pieces of data having the same attribute via a single operation. For example, the pieces of data having the same attribute cannot be searched by a single operation. Furthermore, the amount of work required from the preparation of drawings of the figures to the generation of the NC data is large.

SUMMARY OF THE INVENTION

It is therefore an object of this invention to provide a CAD/CAM device by which the display, search, and modification of the figure elements, three-dimensional curves, and three-dimensional forms can be effected by a unified operation method.

Further, this invention aims at providing a CAD/CAM device by which pieces of data having the same attribute can be processed by a single operation.

A further object of this invention is to provide a CAD/CAM device by which the amount of work required from the preparation of the drawing views to the generation of the NC data is reduced.

The above object is accomplished in accordance with the principle of this invention by a CAD/CAM device which comprises input means for inputting views of a three-dimensional solid; figure processing module means for generating figure data for respective figure elements from the views of the three-dimensional solid input via the input means; a layer table including: figure layers storing information on the figure elements of the input views; three-dimensional curve layers storing three-dimensional specification of three-dimensional curves based on the figure elements; and three-dimensional form layers storing three-dimensional specification of three-dimensional forms based on the three-dimensional curves, the three-dimensional forms defining the three-dimensional solid; wherein the three-dimensional curve layers each include referencing information for referencing figure layers related thereto, and the three-dimensional form layers each include referencing information for referencing three-dimensional curve layers related thereto, such that layers of the layer table have a hierarchical data structure linked via the referencing information.

Preferably, each layer of the layer table includes a hierarchical name including a part representing hierarchical group of the layer, such that layers of a same hierarchical group can be processed by means of a single operation.

Still preferably, the layer table further includes: a work layer for specifying a work step, the work layer including referencing information for referencing form layers needed for specifying the work step, layers of the layer table having a hierarchial structure linked via the referencing information.

According to another aspect of this invention, a CAD/CAM device for defining and editing figures and for preparing work data, the CAD/CAM device comprises: input means for inputting figures including: fundamental figure elements such as points, lines, and circles, and two-dimensional and three-dimensional curves and curved surfaces; a layer table consisting of layers including: figure control information for controlling operations and processing of figures, and other-layer referencing information for referencing other layers; layer definition means for defining layers; layer control editing means for setting and editing the figure control information of respective layers; layer editing means for copying, deleting, and naming respective layers; and layer processing means for selecting, displaying, and modifying respective layers.

Preferably, each layer of the layer table includes hierarchical name in parallel with the figure control information, each one of hierarchical names including at least one hierarchical part representing a hierarchical group; the CAD/CAM device further comprising: specific layer selecting means for selecting a layer by designating a specific hierarchical name; plural layer selecting means for selecting a plurality of layers by designating at least one hierarchical part of the hierarchical name; and hierarchical name editing means for editing the hierarchical names. Further the other-layers referencing information is preferred to include an attribute of each referenced layer referenced by the other-layers referencing information, and the layer table further includes: a work layer for specifying a work step, the work layer including referencing information for referencing form layers related to the work step, layers of the layer table having a hierarchical structure linked via the referencing information.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENT

Referring now to the accompanying drawings, the preferred embodiment of this invention is described.

Figure 1:
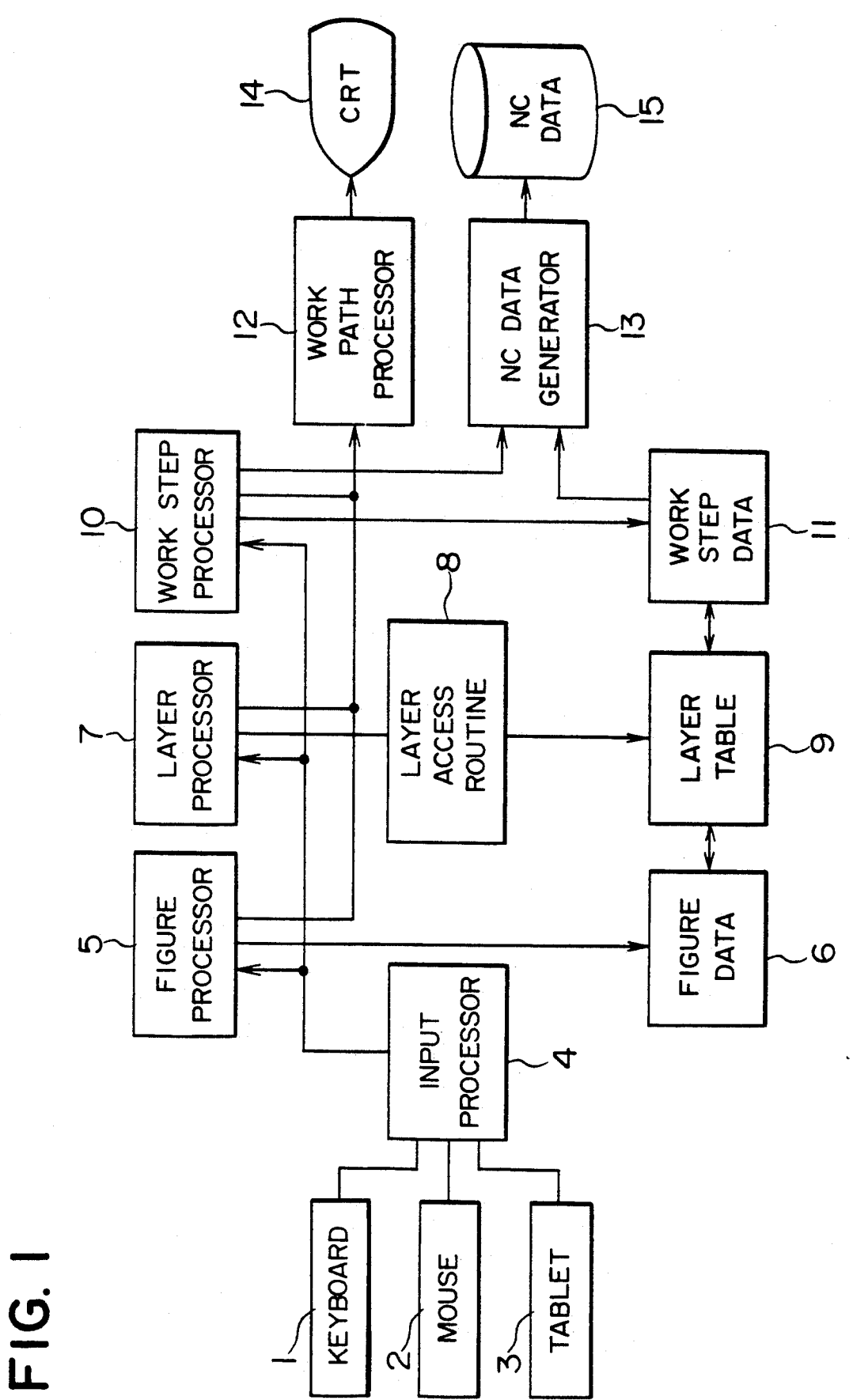
FIG. 1 is a block diagram showing the organization of a CAD/CAM device according to this invention.

FIG. 1 is a block diagram showing the organization of a CAD/CAM device according to this invention. The input data input via a keyboard 1, a mouse 2, or a tablet 3 is interpreted by the input processing module 4 and then is transferred to the interior modules. A figure processing module 5 defines and edits fundamental figure elements such as points, lines, circles, dimensions lines, and legends, of the drawing views, as well as two-dimensional and three-dimensional figures. The figure data 6 are generated by the figure processing module 5.

A layer processing module 7 defines and edits layers. Via a layer access routine 8, the layer processing module 7 sets and references the contents of a layer table 9 maintaining the information of respective layers.

A work step processing module 10 defines and edits the work step data 11 needed for NC data generation. A work path processing module (display processing module) 12 displays various figures and work paths on the CRT display unit 14. An NC data generator module 13 generates the NC data 15 for working a piece of work in accordance with the defined figure. Further, the NC data generator module 13 displays on the screen of the CRT display unit 14 the tool transfer path (or the working trajectory) indicated by the NC data.

Figure 2:
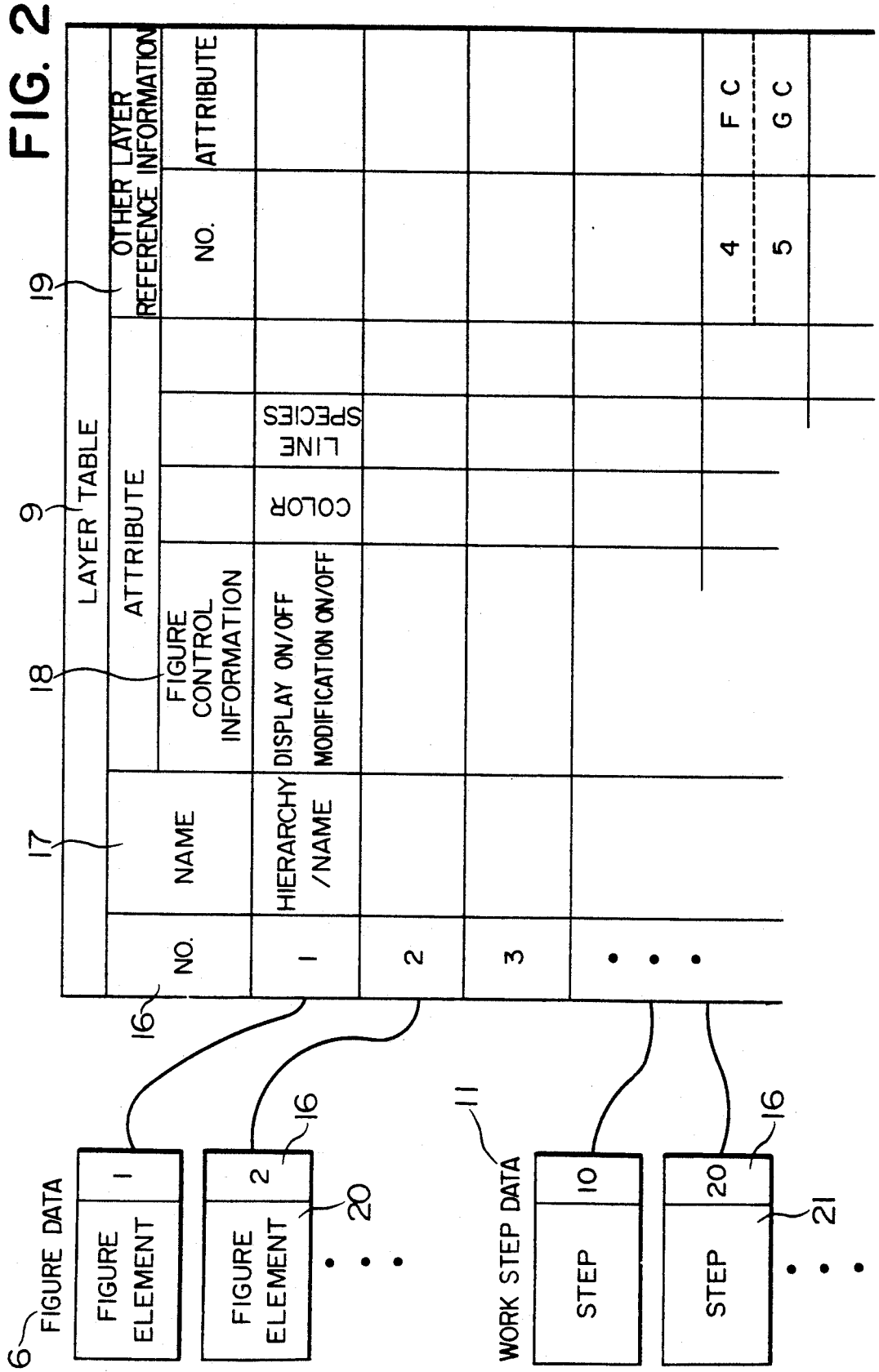
FIG. 2 is a diagram showing the layer table together with the figure data and the work step data of the CAD/CAM device of FIG. 1.

FIG. 2 is a diagram showing the layer table together with the figure data and the work step data of the CAD/CAM device of FIG. 1. The layer table 9 is a collection of layers shown by respective rows in FIG. 2. The layer number 16 shown at the left column of the layer table 9 identifies each layer, such that a high-speed access to respective layers is realized. The items of each layer further include (from left to right): a hierarchical name 17, attributes 18, and other-layers referencing information 19. Each hierarchical name 17 consists of several parts separated by slashes, to represent the hierarchical structure of the layers, such that a high speed search of the groups of layers is realized. The attributes column 18 stores the figure control information of the layer and the information for the working of the work piece. The other-layers referencing information 19 stores the numbers of other layers referenced by the layer and the attributes indicating the purpose of the reference. Further, each item of the other-layers referencing information 19 includes an attribute of the referenced layer in conjunction with the layer numbers.

The figure data 6 is a set of pieces of figure element data 20 such as points, lines, circles, and curves. Each piece of the figure element data 20 includes a layer number 16 of the corresponding layer and is thereby connected to a layer of the layer table 9. The layers of the layer table 9 corresponding to the pieces of the figure element data 20 are referred to as figure layers.

The work step data 11 is a set of work step units 21. Each one of the work step units 21 includes a layer number 16 via which it is connected to a layer of the layer table 9. The layers of the layer table 9 corresponding to the work step units 21 are referred to as the work layers.

Figure 3:
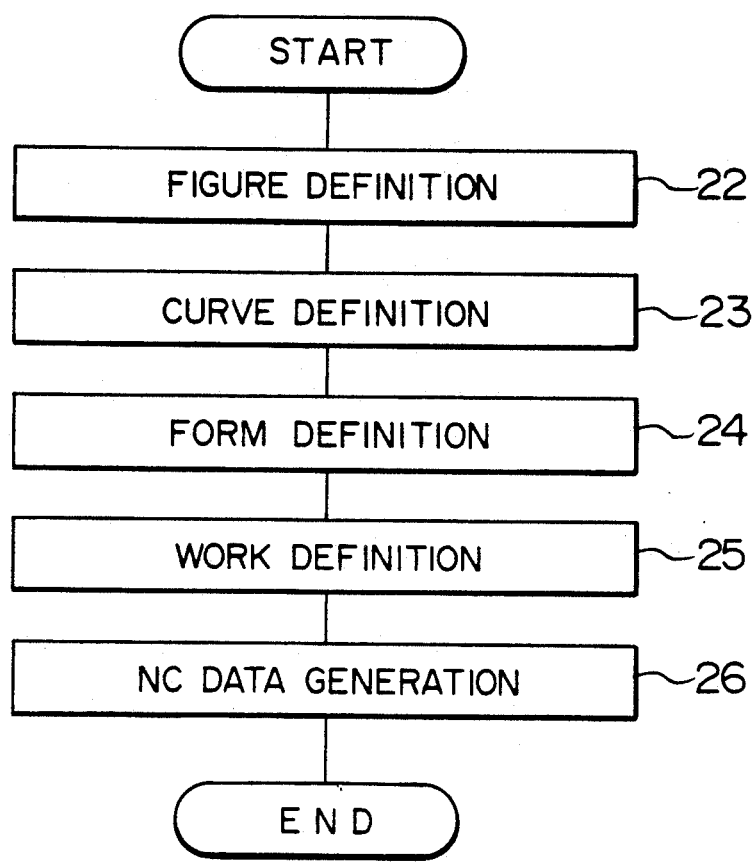
FIG. 3 is a flowchart showing the operations for the CAD/CAM device of FIG. 1.

Next the operation of the CAD/CAM device of FIGS. 1 and 2 is described by referring to the flowchart of FIG. 3.

At the figure definition step S22, the operator inputs drawing views of a figure via the keyboard 1, the mouse 2 or the tablet 3. The operator consults the CRT display unit 14 during input.

Figure 4:
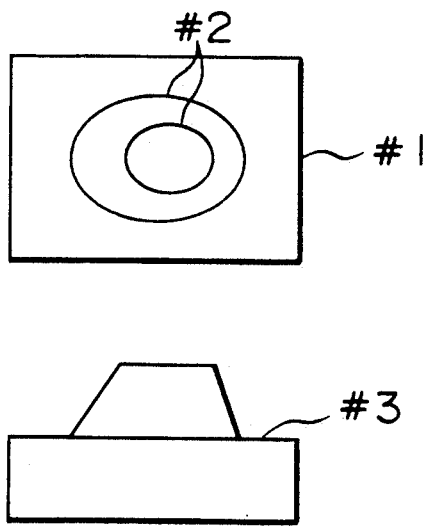
FIG. 4 shows an example of views prepared by the operator.

FIG. 4 shows an example of views prepared by the operator. The top view includes an outer rectangular contour line #1 and two ellipses #2. The side view includes a FIG. #3 consisting of a rectangle and a trapezoid positioned on top of the rectangle. The views of FIG. 4 represent a three-dimensional form, namely an oblique conical frustum positioned on top of a rectangular block, in accordance with which a work piece is to be machined, for example, by a numerically controlled machine tool (not shown).

On the basis of these drawing views input by the operator, the figure data and figure layers are generated via the figure processing module 5 and the layer processing module 7, respectively.

Figure 5:
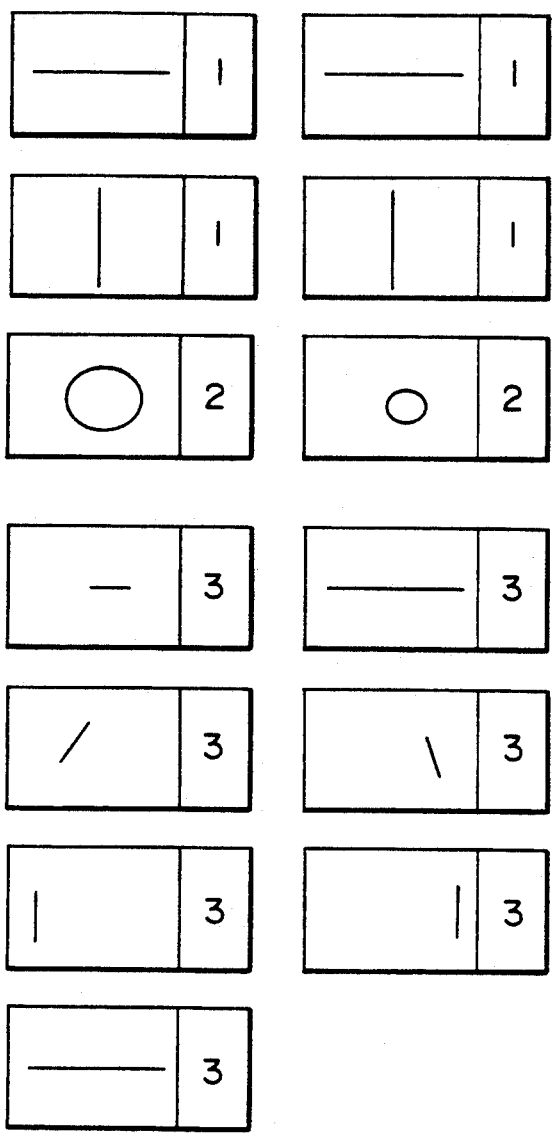
FIG. 5 shows the figure data generated from the views of FIG. 4.

FIG. 5 shows the figure data generated from the views of FIG. 4. The figure elements shown in respective boxes in FIG. 5 each have a layer number (shown at the right within respective boxes) of the corresponding figure layer, and are thereby connected to a figure layer of the layer table 9. The layer numbers correspond to the number shown in FIG. 4. Thus, the figure elements with #1 constitute the outer rectangle #1 of the top view in FIG. 4. The figure elements with #2 correspond to the two ellipses #2 in the top view of FIG. 4. The figure elements with #3 constitute the figure of the side view in FIG. 4.

The figure layers having the layer numbers #1, #2, and #3 are thus generated via the layer processing module 7 and are stored in the layer table 9. The hierarchical name 17 of the layer with layer number #1 is DRAWING/BASE/DRAWING/A. The hierarchical name 17 of the layer with the layer number #2 is DRAWING/BASE/DRAWING/B. The hierarchical name 17 of the layer with the layer number #3 is DRAWING/BASE/DRAWING/C.

At the curve definition step S23, the operator defines three-dimensional curves needed for the specification of the constituent blocks of the three-dimensional solid. Namely, in the front and top views of FIG. 4, for example, the operator designates groups of figure elements constituting three-dimensional curves. The solid of FIG. 4 consists of a bottom rectangular block and a top conical frustum. Thus, the operator first defines three-dimensional curves needed for the specification of the bottom rectangular block. More specifically, by designating the four figure elements with layer number #1 in FIG. 5 and the Z (vertical axis) coordinate value, for example, of the bottom surface of the three-dimensional solid of FIG. 4, the operator may give three-dimensional specifications of the rectangle of the base surface of the rectangular bottom block of the three-dimensional solid. Further, the operator specifies either of the two upright line elements with layer number #3 in FIG. 5 to give the three-dimensional specification thereof. The curves needed for the specification of the top conical frustum are defined in a similar manner.

Then, the pieces of figure data of the designated figure element groups are copied and duplicated within the memory. (The modules or units of FIG. 1 are implemented as a microcomputer and memory units together with input/output peripheral devices.) Further, new layers are prepared by the layer processing module 7 and are stored in the layer table 9. The correspondences between the copied figure element groups and the layers are established via the respective layer numbers. Furthermore, three-dimensional data such as the three-dimensional coordinates of the respective curves are stored in these layers. These layers in which the three-dimensional data are stored are referred to as the curve layers.

Figure 6:
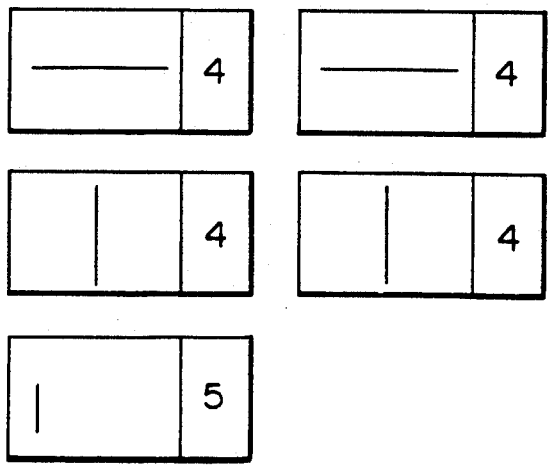
FIG. 6 shows copies of the figure elements of the three-dimensional curves defined by the operator for specifying the bottom rectangular block of the three-dimensional solid of FIG. 4.

FIG. 6 shows copies of the figure elements of the three-dimensional curves defined by the operator for specifying the bottom rectangular block of the three-dimensional solid of FIG. 4. The figure elements with #4 are copies of the figure elements with #1 in FIG. 5. The figure element with #5 is a copy of an upright figure element with #3 in FIG. 5. The numbers #4 and #5 correspond to the layer number 16 of the curve layers in the layer table 9. The hierarchical name 17 of the layer with the layer number #4 is DRAWING/BASE/CURVE/001. The hierarchical name 17 of the layer with the layer number #5 is DRAWING/BASE/CURVE/002.

At the shape or form definition step S24, the operator designates curves and defines three-dimensional solid forms by adding various pieces of information necessary for defining three-dimensional solid forms. By means of this form definition, the form layers are prepared, and the various pieces of information for defining three-dimensional forms are stored in the form layers. Further, the curve layers referencing information (the other-layers referencing information 19) for referencing the curves constituting the three-dimensional form is stored in each form layer.

Figure 7:
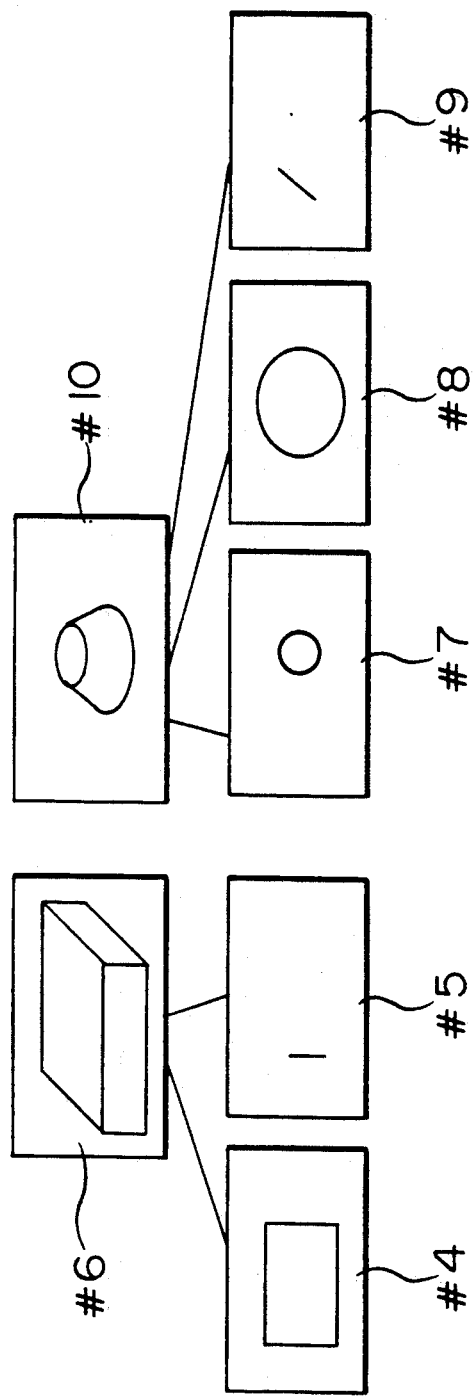
FIG. 7 shows the hierarchical structure consisting of the form layers and curve layers.

FIG. 7 shows the hierarchical structure consisting of the form layers and curve layers. The layer with the layer number #6 is a form layer for specifying three-dimensional form of the bottom rectangular block of the work piece. The layers with the layer numbers #4 and #5 are the curve layers needed for specifying the bottom rectangular block of the solid form of the work piece and are thus connected to the form layer #6. The form layer #6 includes the other-layers referencing information 19 referencing the curve layers #4 and #5. Further, the layer with the layer number #10 is another form layer for specifying the three-dimensional form of the top conical frustum of the work piece. The layers with the layer numbers #7, #8, and #9 are curve layers connected to the form layer #10. The form layer #10 includes the other-layers referencing information 19 referencing the curve layers #7, #8, and #9.

The hierarchical name 17 of the layer number #6 is MACHINING/VOL/ZONE/001. The hierarchical name 17 of the layer with layer number #7 is DRAWING/BASE/CURVE/003. The hierarchical name 17 of the layer with the layer number #8 is DRAWING/BASE/CURVE/004. The hierarchical name 17 of the layer with the layer number #9 is DRAWING/BASE/CURVE/005. The hierarchical name 17 of the layer with the layer number #10 is MACHINING/VOL/SURF/001.

At the work definition step S25, the operator specifies a solid form in accordance with which the work piece is to be worked. This is done by inputting via the keyboard 1 hierarchical names of the form layers representing the three-dimensional forms of the constituent blocks of the work piece, or by pointing via the mouse 2 the figures on the screen representing the forms of the constituent blocks of the work piece.

By means of this work definition, the work layer is generated by the layer processing module 7 and set in the layer table 9, and the work information is stored in the work layer. Further, the form layer referencing information 19 referencing the form layers is stored in the work layer. Furthermore, the work step data 11 specifying the tool, etc., is prepared by the work step processing module 10. The work step data has the layer number of the corresponding work layer.

Figure 8:
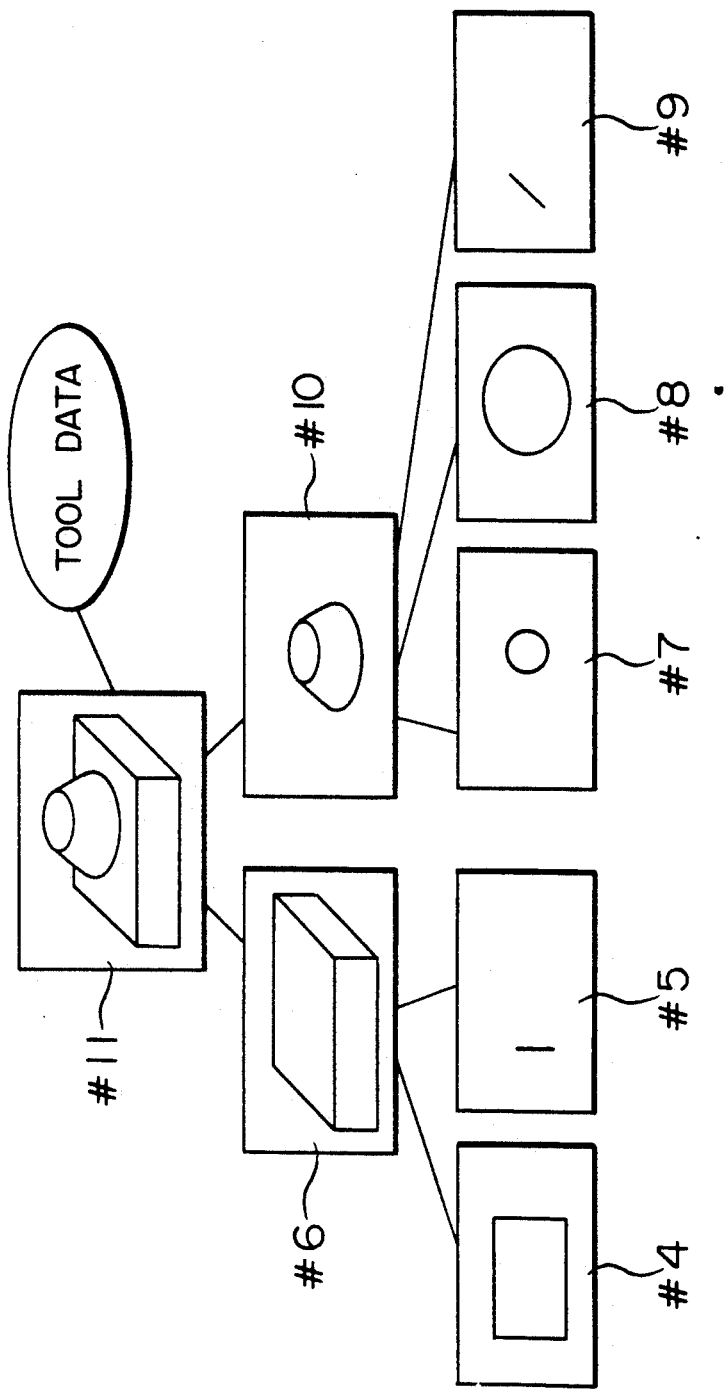
FIG. 8 shows the hierarchical tree structure consisting of the work step data, the work layer, the form layers, and the curve layers.
Figure 9:
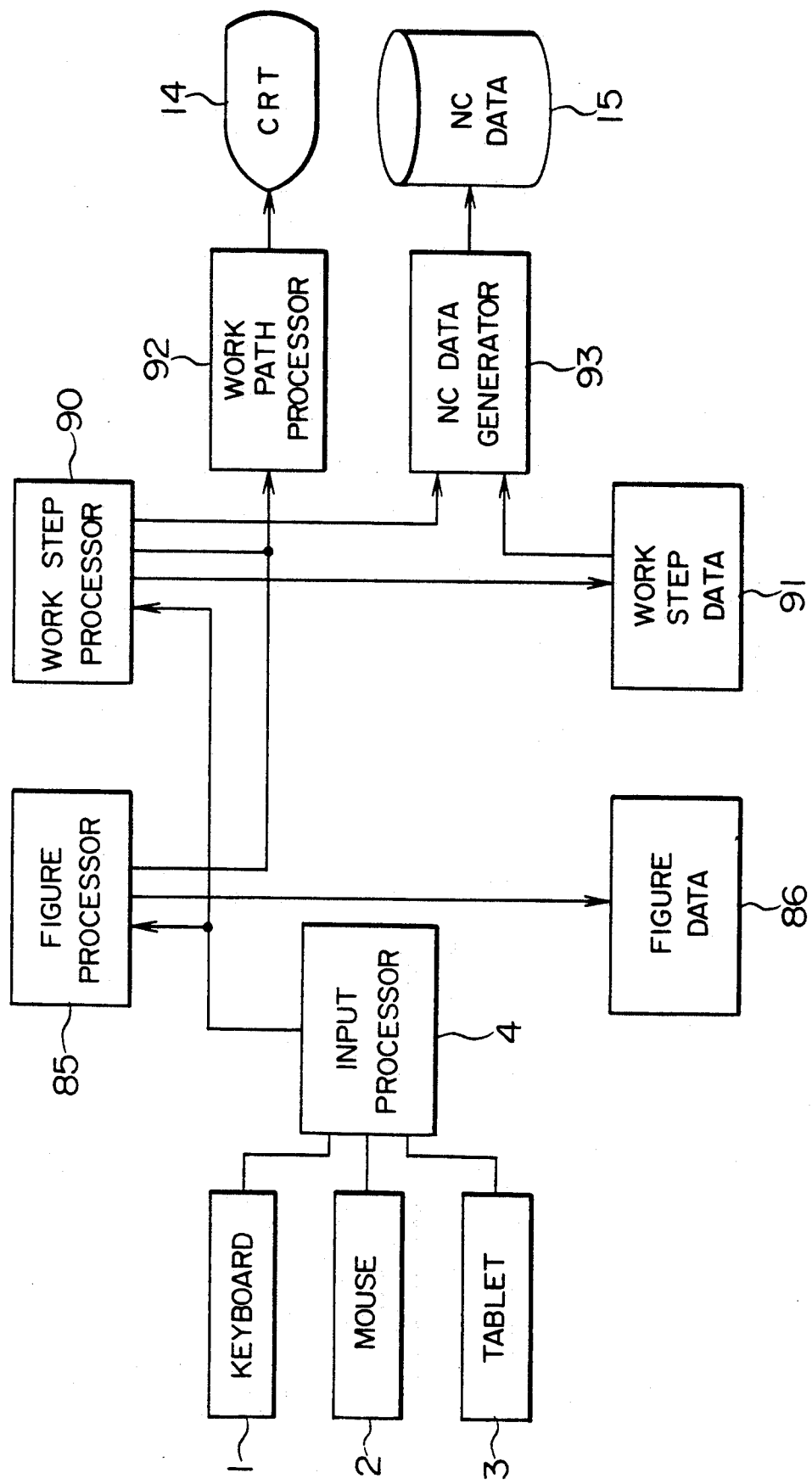
FIG. 9 is a block diagram showing the organization of a conventional CAD/CAM device.

FIG. 8 shows the hierarchical tree structure consisting of the work step data, the work layer, the form layers, and the curve layers. The layer with the layer number #11 is the work layer. The layers with the layer numbers #6 and #10 are the form layers connected to the work layer #11. The other-layers referencing information column 19 of the work layer #11 references the form layers #6 and #10. The layers with the layer numbers #4, #5, #7, #8, and #9 are the curve layers connected to either of the form layers #6 and #10, as described above. The hierarchical name 17 of the layer number #11 is MACHINING/PROCESS/SURF/001.

At the NC data generation step S26, the operator designates a work layer. As described above, each layer contains the other-layers referencing information 19 via which the hierarchical tree structure of the layers can be tracked. Thus, by means of the links provided by the other-layers referencing information 19, all the relevant layers are traced along the paths: work layer→form layer→curve layer→figure data, such that all the branches of the tree are covered. Further, the other-layers referencing information 19 of the work layer contains referencing information for the work step data 11, such that the work step data 11 is retrieved via the link: work layer→work step data. Thus all the information necessary for the generation of the NC data is obtained, and the NC data generator module 13 generates the NC data 15 needed for the machining of the work piece.

By the way, the above order of the figure definition step S22, the curve definition step S23, the form definition step S24, and the work definition step S25 may be modified where desirable and practical.

Since the hierarchical names of the respective layers reflect the hierarchical structure, the operator can effect search by means of the name by designating the hierarchy. Further, the operator can easily divide the figure layers into groups. For example, the operator can classify the figure layers into: the group of the figure layers represented by the same color on the screen; the group of the figure layers the display of which are turned on and off simultaneously; the group of the figure layers selected simultaneously; and the group of figure layers consisting of the dimensional and central lines.

The methods for grouping the figure layers include the following: (1) a plurality of displayed figures are selected sequentially or enclosed within a rectangle by means of the mouse 2 or the tablet 3; (2) hierarchical names including a part (enclosed between slashes) representing the group are assigned to the respective figure layers; (3) the figure layers constituting each group are selected to designate the group.

The maintenance of the groups can be done by preparing a layer representing the groups (referred to as a working group layer) and by establishing correspondence between the figure layers and the working group layer by means of the layer numbers. The operator can also effect grouping with respect to the curve layers, form layers, the work layers in a similar manner.

This invention can be applied not only to a CAD/CAM device consisting of a single unit but also to a CAD/CAM device realized as a function of an automatic programming device, or a CAD/CAM device realized as a function of an automatic programming device included within a numerically controlled device.

What is claimed is:

1. A CAD/CAM device comprising:
   input means for inputting views of a three-dimensional solid;
   figure processing module means for generating figure data for respective figure elements from said views of said three-dimensional solid input via said input means;
   a layer table including: figure layers storing information on said figure elements of said input views; three-dimensional curve layers storing three-dimensional specification of three-dimensional curves based on said figure elements; and three-dimensional form layers storing three-dimensional specification of three-dimensional forms based on said three-dimensional curves, said three-dimensional forms defining said three-dimensional solid; wherein said three-dimensional curve layers each include referencing information for referencing figure layers related thereto, and said three-dimensional form layers each include referencing information for referencing three-dimensional curve layers related thereto, such that layers of said layer table have a hierarchical data structure linked via said referencing information.

2. A CAD/CAM device as claimed in claim 1, each layer of said layer table includes a hierarchical name including a part representing hierarchical group of the layer, such that layers of a same hierarchical group can be processed by means of a single operation.

3. A CAD/CAM device as claimed in claim 1, wherein said layer table further includes: a work layer for specifying a work step, said work layer including referencing information for referencing form layers needed for specifying said work step, layers of said layer table having a hierarchical structure linked via said referencing information.

4. A CAD/CAM device for defining and editing figures and for preparing work data, said CAD/CAM device comprising:
   input means for inputting figures including: fundamental figure elements such as points, lines, and circles, and two-dimensional and three-dimensional curves and curved surfaces;
   a layer table consisting of layers including: figure control information for controlling operations and processing of figures, and other-layer referencing information for referencing other layers;
   layer definition means for defining layers;
   layer control editing means for setting and editing said figure control information of respective layers;
   layer editing means for copying, deleting, and naming respective layers; and
   layer processing means for selecting, displaying, and modifying respective layers.

5. A CAD/CAM device as claimed in claim 4, wherein each layer of said layer table includes hierarchical name in parallel with said figure control information, each one of hierarchical names including at least one hierarchical part representing a hierarchical group; said CAD/CAM device further comprising:
   specific layer selecting means for selecting a layer by designating a specific hierarchical name;
   plural layer selecting means for selecting a plurality of layers by designating at least one hierarchical part of said hierarchical name; and
   hierarchical name editing means for editing said hierarchical names.

6. A CAD/CAM device as claimed in claim 4, wherein said other-layers referencing information includes an attribute of each referenced layer referenced by said other-layers referencing information.

7. A CAD/CAM device as claimed in claim 4, wherein said layer table further includes: a work layer for specifying a work step, said work layer including referencing information for referencing form layers related to said work step, layers of said layer table having a hierarchical structure linked via said referencing information.

* * * * *

UNITED STATES PATENT AND TRADEMARK OFFICE
CERTIFICATE OF CORRECTION

PATENT NO. : 5,272,642
DATED : December 21, 1993
INVENTOR(S) : Junko Suzuki

It is certified that error appears in the above-indentified patent and that said Letters Patent is hereby corrected as shown below:

On the title page, Item [56]: References Cited "Kra elin" should read --Kragelin--.

Column 1 line 31, "girure" should be --figure--.

Signed and Sealed this

Thirty-first Day of May, 1994

*Attest:*

BRUCE LEHMAN

*Attesting Officer*     *Commissioner of Patents and Trademarks*